United States Patent [19]

Govaert et al.

[11] 4,187,536
[45] Feb. 5, 1980

[54] DEVICE FOR ENERGIZING A D.C. MOTOR, COMPRISING AN ACCUMULATOR BATTERY

[75] Inventors: George A. Govaert, Eindhoven; Meinardus A. G. Nijholt; Lammert Rodenburg, both of Drachten, all of Netherlands

[73] Assignee: U.S. Philips Corporation, New York, N.Y.

[21] Appl. No.: 914,570

[22] Filed: Jun. 12, 1978

[30] Foreign Application Priority Data

Jun. 13, 1977 [NL] Netherlands ......................... 7706447

[51] Int. Cl.[2] .......................................... H02M 3/335
[52] U.S. Cl. ...................................... 363/21; 363/97; 320/2; 318/345 F
[58] Field of Search ........... 318/345 R, 345 F, 345 G; 320/2; 363/20, 21, 97, 131, 147

[56] References Cited

U.S. PATENT DOCUMENTS

| | | | |
|---|---|---|---|
| 3,539,898 | 11/1970 | Tolmie | 320/2 X |
| 3,568,038 | 3/1971 | Enders | 363/131 |
| 3,909,696 | 9/1975 | Katou et al. | 363/21 |
| 4,071,884 | 1/1978 | Maigret | 363/21 |
| 4,079,295 | 3/1978 | den Hollander | 363/20 |
| 4,087,850 | 5/1978 | Koizumi | 363/21 |

Primary Examiner—William M. Shoop
Attorney, Agent, or Firm—Thomas A. Briody; William J. Streeter; Bernard Franzblau

[57] ABSTRACT

A small lightweight power-supply device a d.c. motor for powered either by the a.c. supply voltage or by an accumulator battery which dissipates little power and has a well-defined output characteristic for a wide range of input voltages.

The device comprises a flyback converter, the forward sweep time being a function of the output voltage and the current through the primary winding of the transformer of the flyback converter. The forward sweep time is controlled by a control circuit which is integrated for the greater part. There is provided a starting circuit. A level detector in the control circuit ensures that this circuit is activated only when its supply voltage, which is applied via the secondary winding of the transformer, is sufficiently high.

14 Claims, 23 Drawing Figures

| F | G | H | K | L | M |
|---|---|---|---|---|---|
| 0 | 1 | 0 | 1 | 0 | 1 |
| 0 | 0 | 1 | 0 | 1 | 0 |
| 1 | 0 | 0 | 1 | 0 | 0 |
| 1 | 1 | 0 | 1 | 0 | 0 |

DEVICE FOR ENERGIZING A D.C. MOTOR, COMPRISING AN ACCUMULATOR BATTERY

The invention relates to a device for energizing a d.c. motor, in particular a motor for an electric shaving apparatus, which device comprises a flyback converter having an output circuit to which the motor may be connected. The flyback converter comprises a control circuit, which for the greater part is designed as an integrated circuit, for generating control pulses with a fixed frequency of the order of tens of kHz and with a controlled pulse duration for controlling a switching element which is connected in series with the primary winding of the transformer in the flyback converter. The control circuit includes means for controlling the pulse duration of the control pulses depending on the output voltage and the current through the primary winding of the transformer.

A universal power supply device comprising a flyback converter is described in "Philips' Application Information" No. 475, August 1975. The frequency of the forward sweeps (i.e. the time intervals during which the switching element conducts) is determined by the frequency of an oscillator which is included in the control circuit.

A power supply for energizing the motor of a small electrical appliance, such as a shaving apparatus, should be small and light. This means that as far as possible the circuit elements should be integrated and that the non-integrated elements such as the transformer and (smoothing) capacitors should be as small as possible. Moreover, from the point of view of the user, the heat developed in the circuit should be minimized. Operation of the apparatus should also be possible in the absence of an external voltage source, i.e. the mains voltage, which means that the power supply device must contain a rechargeable accumulator battery. A further requirement is that the loaded motor should also be capable of starting directly and smoothly when the accumulator battery is not charged.

The device described in "Philips' Application Information" No. 475 is not very suitable for energizing a small electrical apparatus. In the known device the output voltage of the flyback converter, which voltage is used as a control voltage in the control circuit and from which voltage moreover the supply voltage for the control circuit is derived, is applied to the control circuit via a separate transformer winding. Such a third transformer winding results in increased volume and weight of the transformer.

In order for the power supply device to be started an auxiliary circuit is required which, when the control circuit is still inactive, can supply the base current for a switching transistor which is connected in series with the primary winding. The auxiliary circuit ensures that the starting current is derived from the input voltage (the mains voltage). The known auxiliary circuit comprises two high-voltage transistors which cannot be integrated and is connected to the input voltage via a high-ohmic resistor. Finally, the known auxiliary circuit comprises a large number of additional elements.

It is an object of the present invention to provide a power supply device, based on the flyback-converter principle, which dissipates little energy, which is small and light and yet exhibits a controlled output characteristic for a wide range of input voltages. The device in accordance with the invention is characterized in that a rechargeable accumulator battery is connected in series with the secondary winding and a switching means is provided for connecting the motor in parallel with the accumulator battery. The power-supply capacitor is provided for energizing the control circuit, which power-er-supply capacitor is charged from the secondary winding of the transformer. The control circuit further comprises a voltage-level detector which keeps the control circuit in the active state when the voltage across the power supply capacitor exceeds a specific threshold voltage. The starting circuit is provided which comprises a starting capacitor, which circuit in the case of an inactive control circuit supplies the control current for the switching element if the voltage across the starting capacitor and the instantaneous input voltage exceed a specific level. The control circuit also comprises a detection circuit for detecting the current through the primary winding of the transformer and the instantaneous value of the input voltage, the pulse duration of the control pulses also being determined by the output signal of the detection circuit.

The invention is based on the recognition that by combining a number of steps, which are partly known per se, a power supply device can be achieved having a high efficiency and that certain elements, such as high-voltage transistors and diodes, can be protected against excess currents or excess voltages. The power supply device can for the greater part be integrated and can thus be small and light.

An auxiliary circuit comprising high-voltage transistors and a high-ohmic resistor, as used in the device in accordance with "Philips' Application Information No. 475", is no longer necessary. In the device in accordance with the invention this entire auxiliary circuit has been replaced by a capacitor and a resistor. Certain external elements (i.e. elements which cannot be integrated with the rest of the control circuit) that are used in the prior art device may be dispensed with in the device in accordance with the invention owing to the special power-control method.

At a specific level of the input voltage the starting circuit starts to supply a control current for the switching element. The voltage-level detector detects whether at that instant the supply voltage for the control circuit is adequate. If this is the case, the control circuit is activated. Thus, it is prevented that the frequency of the control pulses starts to drift and that control via the control circuit is no longer well defined.

In accordance with a further characteristic feature of the device in accordance with the invention the control circuit comprises a voltage generator which supplies a periodic voltage with linear edges. A pulse-width modulator has a first input connected to the voltage generator and a voltage determined by the output voltage is applied to a second input of said modulator. A logic circuit for transferring the pulses supplied by the pulse-width modulator to the control input of the switching element has a first input connected to the output of the voltage generator and a second input connected to the output of both the pulse-width modulator and the detection circuit. The logic circuit ensures that the control circuit can supply only one control pulse during one period of the voltage generator.

The output voltage of the power supply device in accordance with the present invention is to be understood to mean the voltage across the accumulator battery, if the motor is switched on, or the voltage across a charging indicator which is connected in series with the accumulator battery, if the motor is not switched on and the accumulator battery is being charged.

Preferably, the voltage generator supplies a triangular voltage and this generator, as well as the logic circuit, are controlled from the starting circuit. The advantage of the triangle generator is that the control circuit need not handle any large current transients which may give rise to interference (cross-talk in the integrated circuit), and that the duration of the switching pulses can simply be varied between 0 and 50% of the period of the voltage supplied by the generator.

A starting circuit in accordance with the invention features a thyristor circuit which comprises a zener diode and, in parallel with the starting capacitor, a second switching element is connected which has a control input connected to the inverted output of the control circuit.

Breakdown of the thyristor circuit is determined by the breakdown voltage of the zener diode. At a specific value of the voltage across the starting capacitor, and when a built-in current threshold of the thyristor circuit is exceeded, the starting circuit supplies a control current to the switching element. The second switching element, for example a transistor, is connected in parallel with the starting capacitor and renders the starting circuit inactive when the control circuit supplies control pulses. Apart from the starting capacitor, the starting circuit can be integrated with the control circuit.

Preferably, the starting circuit comprises a second thyristor circuit for turning off the first thyristor circuit when the voltage across the starting capacitor is smaller than a specific value. Via the second thyristor circuit the capacitor is allowed to discharge completely.

Apart from being controlled as a function of the output voltage, the duration of the switching pulses should also be controlled as a function of the output power. For this purpose the power supply device comprises a detection circuit for detecting the current through the primary winding of the transformer so that the duration of the switching pulses can be adapted to the magnitude of this current in relation to the input voltage and the output voltage. If the power supply device is to function correctly at different values of the input voltage, the detection circuit should be adapted in such a way that the value of the input voltage plays a part in detecting the current through the primary winding.

A first example of an adapted detection circuit comprises a thyristor circuit having a control input which recieves the voltage across an emitter resistor of a switching transistor connected in series with the primary winding, as well as the voltage from a voltage divider. The voltage divider is connected in parallel with the series connection of the primary winding and the collector-emitter path of the switching transistor.

A second example of an adapted detection circuit comprises a differential amplifier having an input at a fixed voltage and a second input at a voltage which is proportional to the current through the primary winding of the transformer, the tail current being proportional to the voltage across the starting capacitor.

Preferably, the detection circuit comprises a second differential amplifier having one input connected to the output of the first differential amplifier and a second input that receives the output voltage via a voltage divider. As a result of this construction, a correct starting characteristic is obtained and the device is short-circuit proof.

The invention will now be described in more detail with reference to the drawing. In the drawing:

FIGS. 8a–8f is a diagram of voltages and pulses which appear at various points in the control circuit.

In these Figures corresponding elements bear the same reference numerals.

Figure 1:
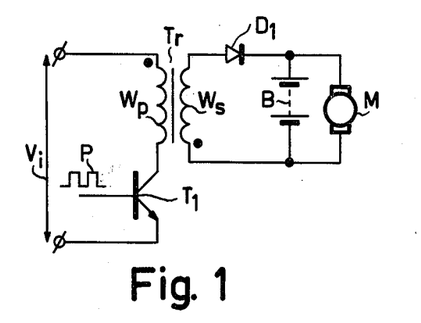
FIG. 1 shows the principle of a flyback converter.

The power supply device in accordance with the invention is based on the principle of the flyback converter. The principal of such a converter is illustrated in FIG. 1.

During the time that the switching transistor $T_1$ is conductive, the so-called "forward sweep", a current which increases linearly with time flows through the primary winding $W_p$ of the transformer $T_r$ so that a certain amount of magnetic energy is built up in this winding. During the time that the transistor $T_1$ is turned off, the so-called "flyback", the stored energy is supplied to the accumulator battery B and the motor M. The transistor $T_1$ is controlled by a pulse train P. The pulses have a fixed and comparatively high frequency, for example 25 kHz. The advantage of the high frequency is that for transferring a specific amount of energy the dimensions of the transformer can be minimized. The frequency of the pulses is determined by a signal generator, for example a triangle generator, which is included in a control circuit. This control circuit further comprises elements which control the pulse duration of the switching pulses, and thus the duration of the forward sweeps, as a function of the output voltage, the input voltage and the current through the primary winding.

Figure 2:
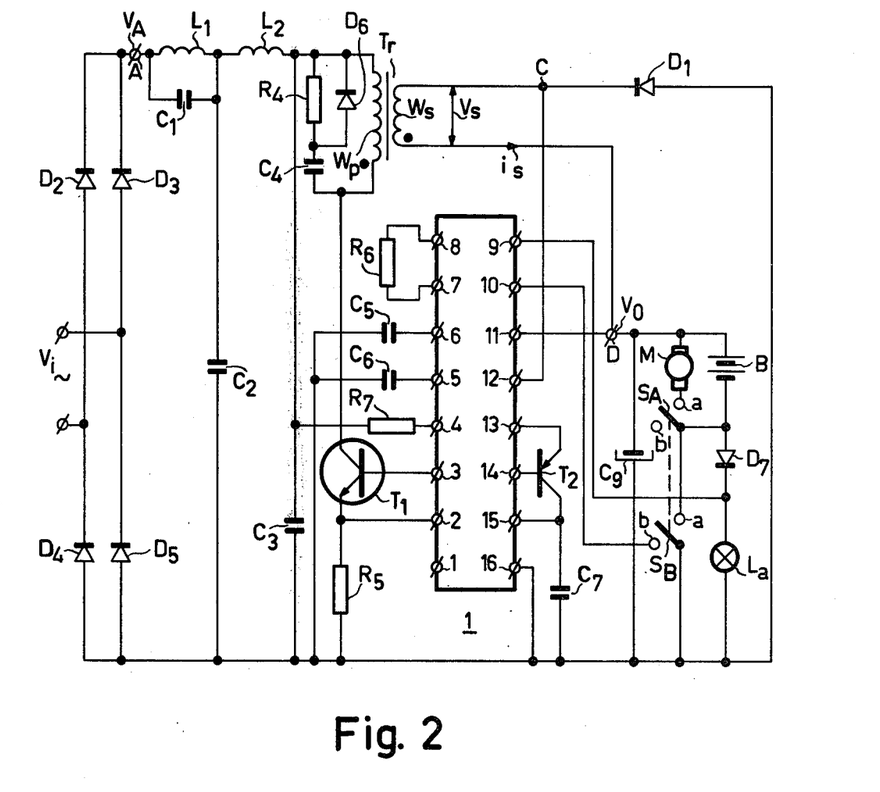
FIG. 2 shows a power supply device in accordance with the invention provided with a control circuit in the form of an integrated circuit.

The present invention in particular relates to said control circuit, which is integrated for the greater part. FIG. 2 shows how this control circuit 1 is included in the power supply device.

The power supply device comprises a full-wave rectifier consisting of four diodes $D_2$, $D_3$, $D_4$ and $D_5$.

The input voltage may be an alternating voltage, for example the a.c. supply voltage or it may also be a direct voltage. The rectified voltage $V_A$ is applied directly, without being smoothed, to the primary winding $W_p$. A comparatively large smoothing capacitor is no longer necessary so that space is saved. Between point A and the primary winding an interference suppression circuit may be included. This interference suppression circuit for example comprises two inductances $L_1$ and $L_2$ and three capacitors $C_1$, $C_2$ and $C_3$. In parallel with the primary winding is a damping circuit, for example, consisting of a resistor $R_4$, a capacitor $C_4$ and a diode $D_6$. The interference suppression circuit and the damping circuit are not essential to the present invention and will not be discussed in any more detail.

In series with the primary winding $W_p$ is a high-voltage switching transistor $T_1$, for example a transistor of type type "Philips BUX 86". Instead of a transistor it is also possible to use a different switching element. The base of transistor $T_1$ is connected to the output 3 of the control circuit 1 so that the switching pulses produced in this control circuit turn the high-voltage transistor on and off.

The motor M of a small electric apparatus, such as an electric shaving apparatus or an electric hair-trimming apparatus, can be connected in series with the transformer secondary winding $W_s$ and in parallel with the series connection of the accumulator battery B, a diode $D_7$ and a charging indicator lamp $L_a$ by means of the switches $S_A$ and $S_B$ which are operated simultaneously. If the switches $S_A$ and $S_B$ are in position a, the motor is powered by the input voltage $V_i$ or by the accumulator battery. When the switches are in position b, the motor is disconnected from the power-supply circuit. The accumulator battery is then charged if an input voltage $V_i$ is present. $C_9$ is a buffer capacitor which is used for charging the accumulator battery. Large currents, which may appear during the flyback of the flyback converter, are intercepted by $C_9$ so that these currents cannot flow through the accumulator battery and the charging indicator $L_a$.

In the absence of an input voltage $V_i$ the control circuit is not activated and this circuit cannot draw any current from the accumulator battery.

The voltage at point D, to be referred to hereinafter as the output voltage $V_0$, is applied to the input 11 of the integrated circuit 1. Thus, the voltage $V_0$ also determines the pulse duration of the switching pulses applied to the base of the transistor $T_1$. Furthermore, the voltage across the emitter resistor $R_5$ of the transistor $T_1$ is applied to the input 2 of the integrated circuit so that the current through the switching transistor also determines the duration of the switching pulses.

Figure 3:
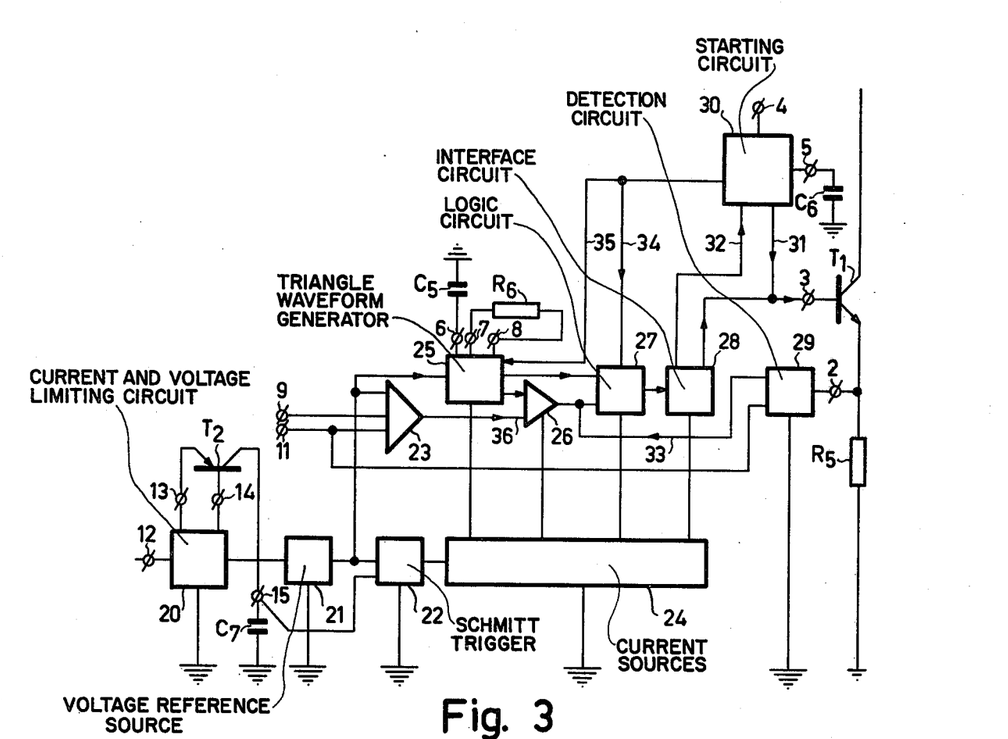
FIG. 3 shows the control circuit for this power supply device in block-schematic form.

The control circuit 1 comprises a large number of sub-circuits. FIG. 3 is a block-diagram of the control circuit.

For the power-supply of the control circuit 1, a low and stable direct voltage is required. It is possible to derive this supply voltage from the voltage $V_A$. However, the voltage $V_A$ should then be applied to the control circuit via a high-value resistor, which dissipates much energy, and a smoothing capacitor of high value. Therefore, it is preferable to derive the supply voltage from the output circuit of the transformer Tr (FIG. 2). Since d.c. isolation is not needed between the input voltage $V_i$ and the output voltage $V_0$, a separate transformer winding is not needed and the supply voltage can be derived via the winding Ws. For this purpose an auxiliary circuit is required. This auxiliary circuit in the control circuit ensures that a sufficiently high supply voltage is available at a sufficiently high input voltage $V_i$ for the control circuit.

The power supply device in accordance with "Philips Application Information" No. 475 also includes an auxiliary circuit for the above-mentioned purpose. However, the known auxiliary circuit is not very suitable for use in the power supply device now proposed. This is because the voltage $V_a$ is a relatively unsmoothed voltage. The known auxiliary circuit comprises a number of external elements, such as high-voltage transistors. As long as the known auxiliary circuit is switched on, the power loss in this circuit is high.

In accordance with the present invention a starting circuit which comprises a starting capacitor is used instead of the known auxiliary circuit. With such a starting circuit starting the control circuit presents no problem and starting is possible in any period of the input voltage. This starting circuit, which is to be described in more detail hereinafter, is designated 30 in FIG. 3. If the input voltage $V_i$ has reached a certain level, the starting circuit supplies a starting pulse to the base of the switching transistor $T_1$ via the connection 31 (the output 3 of the integrated circuit). The starting circuit is connected to point A via the resistor $R_7$ and the inductances $L_2$ and $L_1$ (see FIG. 2).

The voltage at point C (FIG. 2) is used for powering the integrated circuit 1. This voltage is applied to the power supply capacitor $C_7$ via the current and voltage limiting circuit 20 (FIG. 3) and a transistor $T_2$ so that said capacitor is charged. The voltage on the capacitor $C_7$ is compared with the voltage of a voltage reference source 21, and the result is applied to a level detector in the form of a Schmitt trigger 22. The starting circuit and the Schmitt trigger ensure that the control circuit 1 is not switched on and will not supply switching pulses until the voltage on the capacitor $C_7$ is high enough, or, in other words, until the input voltage $V_i$ has a certain level. The Schmitt trigger then switches on a number of current sources, which are schematically represented by the block 24. As a result of this, the circuits 25, 26, 27 and 28 are activated. Element 23 is an amplifier for amplifying the output voltage $V_O$. Circuit 25 is a triangle wave generator. If desired, a sawtooth generator may also be used for this purpose. The circuit 26 is a pulsewidth modulator, for example in the form of a differential amplifier, in which the output voltage of the amplifier 23 is compared with the voltage from the generator 25. The circuit 27 is a logic circuit which, depending on the conditions at the output of the power supply circuit, transfers switching pulses to the base of the transistor $T_1$. This circuit is also controlled by the detection circuit 29, which inter alia detects the current through the primary winding. Finally, the circuit 28 is an interface which converts the small signal from the logic circuit 27 into a current which is suitable for the high voltage transistor.

The operation of the power supply device in accordance with the invention will now be described in more detail. The description starts from the situation in which the switches $S_A$ and $S_B$ are in position a. It is assumed that the accumulator battery is unchanged and that an alternating voltage $V_i$ is applied at the instant that this voltage is 0 Volts. In that case there is no voltage at the base of the switching transistor $T_1$ so that this transistor is cut off. As the voltage $V_i$ increases the voltage $V_A$ and thus the voltage at the input 4 of the integrated circuit 1 increases. As a result of this, the capacitor $C_6$ of the starting circuit is charged. As soon as the voltage across the capacitor $C_6$ has reached a certain value and the voltage $V_i$ is sufficiently high, for example 70–80 volts, the starting circuit 30 supplies a starting pulse to the base of the transistor $T_1$. $T_1$ is then turned on (start of a "forward sweep" of the flyback converter) and a certain voltage is produced across primary winding $W_p$. Via secondary winding $W_s$ this voltage is transformed to a voltage $V_s$. Via the current and voltage limiting circuit 20 the voltage $V_s$ is used for charging the power supply capacitor $C_7$. In a very short time interval, which is shorter than the time interval in which the switching transistor $T_1$ is held in the conductive state by the starting circuit, the power supply capacitor is charged to such a value that the voltage level detector, the Schmitt trigger 22, changes over. Owing to the change-over of the Schmitt trigger the current sources 24 are switched on. The control circuit then takes over the forward sweep and supplies switching pulses with a repetition frequency of for example 25 kHz.

As is to be described hereinafter, the output voltage $V_O$, after being amplified, is compared with the triangular voltage from the generator 25 in the pulse width modulator 26. As a result, the duration of the switching pulses which are supplied to transformer $T_1$ is also determined by the voltage $V_o$. During the first forward sweep voltage $V_O$ is low. During this first forward sweep the current through the transistor $T_1$ cannot as yet increase far enough so that the detection circuit 29 starts to supply a pulse, which reduces the duration of the switching pulses, via the connection 33. The duration $\tau_f$ of the first forward sweep is given by $C_6 V_6 = I_s \times \tau_f$, where $C_6$ is the capacitance of the starting capacitor, $V_6$ the voltage across the starting capacitor, and $I_s$ the current which flows through the current-limited thyristor circuit of the starting circuit (see FIGS. 11 and 12).

During the time that the transistor $T_1$ is turned off, i.e. the flyback time, the decrease of the voltage across the capacitor $C_7$ is so small that the voltage across $C_7$ remains above the threshold value of the Schmitt trigger. The Schmitt trigger then does not change over and the control circuit 1 remains operative.

During the next forward sweep $C_7$ is re-charged. As a result, the transistor $T_1$ will be turned on and off a large number of times, for example 250 times, during one half-cycle of the input voltage $V_i$.

The power supply capacitor $C_7$ can be comparatively small, for example 0.47 $\mu$uF, because switching takes place with comparatively high frequencies and the control circuit consumes little current during the flyback time, when the voltage $V_s$ is not present.

As long as the control circuit is active, the starting circuit can be switched off via the connection 32.

Figure 14:
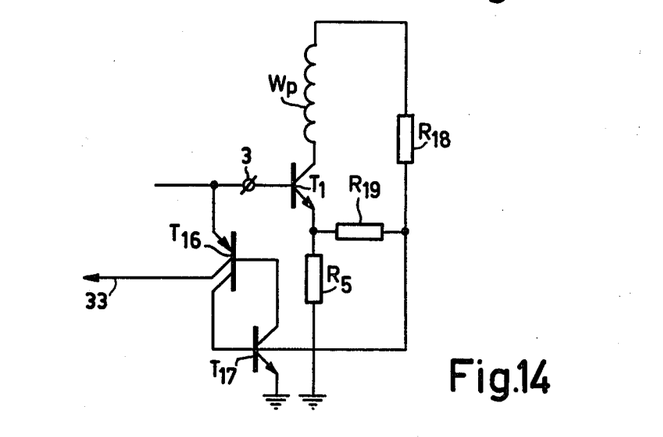
FIGS. 14 and 15 show examples of a detection circuit in accordance with the invention.

As the input voltage $V_i$ increases, the current through the transistor $T_1$ will become so large that at a given instant during each forward sweep of the flyback converter the detection circuit 29, to be described hereinafter with reference to FIGS. 14 and 15, supplies a pulse to the logic circuit 26 via the connection 33. This pulse ensures that the duration of the relevant forward sweep is reduced. During a certain time interval, thus for a number of successive forward sweeps, the duration of said forward sweeps is then also controlled by the detection circuit 29 via the logic circuit 27. This lasts until the input voltage $V_i$ has decreased so far that the detection circuit 29 no longer supplies a pulse.

Upon a further decrease of the input voltage $V_i$ the voltage across the capacitor $C_7$ decreases upon each flyback. At a given instant this voltage has decreased so far that the Schmitt trigger 22 is reset, so that the control circuit 1 is rendered inoperative and the transistor $T_1$ remains cut off for the rest of the relevant half-cycle of the input voltage $V_i$. During the next half-cycle of this input voltage, as soon as the level of said voltage has reached said specific value, for example 70 volts, the starting circuit 30 again supplies a starting pulse to the base of the transistor $T_1$. The integrated circuit 1 is then activated again so that said control circuit again supplies a number of switching pulses to the base of the transistor $T_1$.

A special feature of the flyback converter in accordance with the invention is that the supply voltage for the control circuit 1 is not always present, but that it is switched on by this circuit itself. If the pulse from the starting circuit appears at an incorrect instant, i.e. at an instant that $V_i$ is not yet high enough to charge $C_7$ during a pulse of the starting circuit, the control circuit 1 is not switched on owing to the presence of the Schmitt trigger 22. This is then postponed until the starting conditions are satisfied again, i.e. the starting capacitor has been charged sufficiently and the input voltage $V_i$ is sufficiently high.

During the flyback period of the converter an average current of for example 1.8 A is pumped into the motor and the accumulator battery from winding $W_s$ via the diode $D_1$. The greater part of the output current $I_s$ then flows via the motor M.

Figure 4:
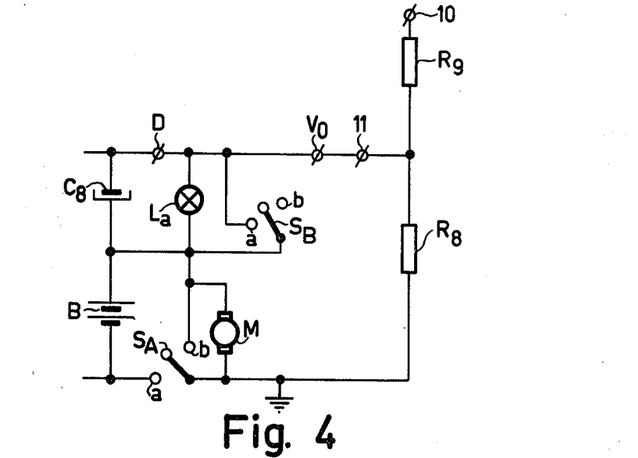
FIG. 4 shows a first example of the output circuit of the flyback converter.

Instead of the arrangement shown in FIG. 2, the elements in the output circuit may also be arranged in the manner as shown in FIG. 4. The parallel connection of a charging indicator La and a charging capacitor $C_8$ is then connected in series with the parallel-connection of the motor M and the accumulator battery B. Use can then be made of the fact that the terminal voltage of the accumulator batteries, which are for example Ni-Cd batteries, rapidly reaches a specific value when the flyback converter is switched on although the batteries have not yet been charged.

As long as the switches $S_A$ and $S_B$ are in position a, the output voltage $V_O$ is equal to the voltage across the accumulator battery. This voltage may for example be applied to the starting circuit 30 in a manner to be described with reference to FIG. 11. At increasing battery voltage the starting circuit can then supply a starting pulse for continually decreasing values of the input voltage $V_i$. Then a continually increasing part of the period of the input voltage $V_i$ is used so that the average output current continually increases. Thus, a large current which may be needed by the motor during starting can be supplied so that the motor can start correctly. For example, for a battery voltage of 1.2 V the current through the motor is for example 2 A.

After some periods of the input voltage $V_i$ the battery voltage has become so high (for example 2 volts) that the voltage across the capacitor $C_7$ can no longer decrease far enough to reset the Schmitt trigger 22. The control circuit 1 then remains continuously operative. The battery voltage increases slightly further, for example to 2.4 V, and the motor then runs with the desired speed. In this situation the current through the motor is for example approximately 1 A. The voltage $V_O$, the battery voltage, now also controls the duration of the forward sweeps, via the circuits 23, 26 and 27 (FIG. 3), so that the output voltage $V_O$ is stabilized.

The Ni-Cd accumulator batteries are then employed as a buffer capacitor as long as they are not fully charged. This is possible as long as the terminal voltage per accumulator battery does not exceed approx. 1.25 V. The Ni-Cd buffer capacitors have the advantage that they have a high capacitance, for example 6 farads, with comparatively small dimensions and comparatively low weight. The internal resistance of the Ni-Cd accumulator batteries is very low, for example $R_i = 12$ m.ohms, so that comparatively large ripple currents are permissible.

When the switches $S_a$ and $S_b$ are in position a the greater part of the output current $i_s$ flows through the motor and the accumulator battery is not charged essentially. Charging will not begin until the switches $S_a$ and $S_b$ have been set to position b. During charging of the accumulator battery the flyback converter in principle operates in the same way as when the motor is being driven. However, in the arrangement in accordance with FIG. 4 the function of the accumulator battery is then taken over by the capacitor $C_8$. The voltage across this capacitor and thus the voltage across the lamp La is maintained constant so that this voltage is used as the output voltage $V_O$ by means of which the duration of the forward sweeps is controlled. The charging current for the accumulator battery is then maintained constant.

The Ni-Cd accumulator batteries which are used may be charged continuously with the maximum charging current which can occur in the present power supply device.

When in the arrangement in accordance with FIG. 4 the input voltage $V_i$ is applied with the accumulator battery still unloaded, there may briefly be a large negative current through the battery. Owing to the internal resistance of the accumulator battery a negative voltage will then briefly appear across the accumulator battery, i.e. at point 11 in FIG. 4. A negative voltage at this point is undesirable because it may give rise to parasitic effects in the I.C. Furthermore, in the arrangement of FIG. 4 no further steps have been taken in order to compensate for the temperature dependence of the accumulator battery.

Figure 5:
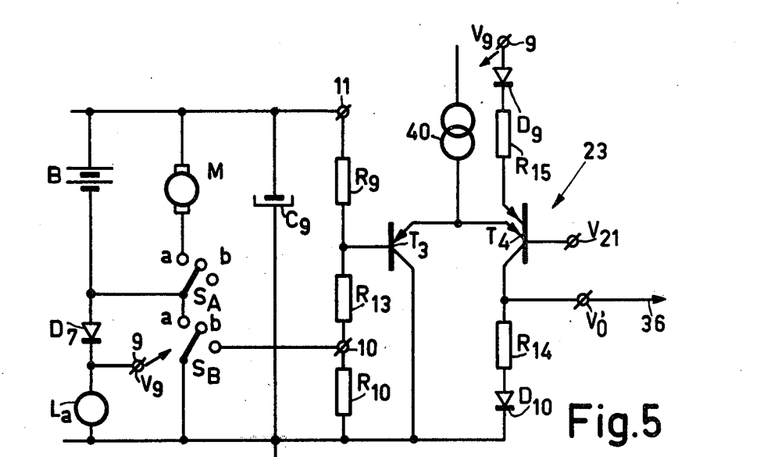
FIG. 5 shows a second example of such an output circuit and also an amplifier for the output voltage, FIG. 6, in block schematic form, shows a part of a control circuit comprising a sawtooth generator, FIGS. 7a and 7b respectively show the voltage supplied by said generator and the output voltage of the pulse-width modulator to which the sawtooth voltage is applied.

An improved arrangement for the output circuit of the flyback converter is shown in FIG. 5. Furthermore, FIG. 5 shows how the voltage across the accumulator battery and the voltage across the charging indicator are applied to the amplifier 23. This amplifier is a differential amplifier comprising the transistors $T_3$ and $T_4$ whose emitters are connected to the current source 40. The collector of the transistor $T_3$ is connected to ground. The collector of the transistor $T_4$ is connected to ground via the resistors $R_{14}$ and the diode $D_{10}$. The base of the transistor $T_4$ receives a fixed voltage $V_{21}$, of for example 1.2 V, which is determined by the reference voltage source 21. If the switches $S_A$ and $S_B$ are in position a, the buffer capacitor $C_9$ is connected in parallel with the motor M, and if the switches are in position b it is connected in parallel with the series connection of the accumulator battery, the diode $D_7$ and the charging indicator La.

If the switches $S_A$ and $S_B$ are in position a the voltage at the base of the transistor $T_3$ is determined by the voltage across the accumulator battery via the voltage divider $R_9$, $R_{10}$, $R_{13}$.

The amplified output voltage $V_o'$ is applied to the pulse width modulator 26 via the connection 36 (see FIG. 3). The duration of the forward sweeps of the flyback converter is determined by the level of the voltage $V_o'$. When the output voltage $V_o$ increases the amplified output voltage $V_o'$ increases and the forward sweeps become shorter. When the voltage $V_o$ decreases the forward sweeps have a longer duration with a maximum of half the period of the voltage supplied by the generator 25.

When the accumulator battery is charged, i.e. when the switches $S_A$ and $S_B$ are in position b, the base of transistor $T_3$ is connected to ground via the resistor $R_{13}$. The voltage $V_9$ across the charging indicator is applied to one of the two emitters of the transistor $T_4$ via the diode $D_9$ and the resistor $R_{15}$. If the voltage $V_9$ exceeds the sum of the voltage $V_{21}$, the voltage across the diode $D_9$ and the base-emitter threshold voltage of the transistor $T_4$, the voltage $V_9$ is directly transferred to the pulse width modulator 26. The duration of the forward sweeps is then controlled so that the voltage $V_9$ remains constant whereby the charging current for the accumulator battery remains constant. The voltage $V_o$ at point 11 is then lower than in the case where control is effected in response to the voltage across the resistors $R_{10}$ and $R_{13}$.

At the transition from a forward sweep to a flyback the battery voltage is not well-defined so that this voltage is then not suitable for control purposes. During such a transition the output voltage of the differential amplifier 23 is briefly suppressed with the aid of the diode $D_{10}$ and it is not until after this that the amplified output voltage is measured and is used as a control parameter.

Figure 6:
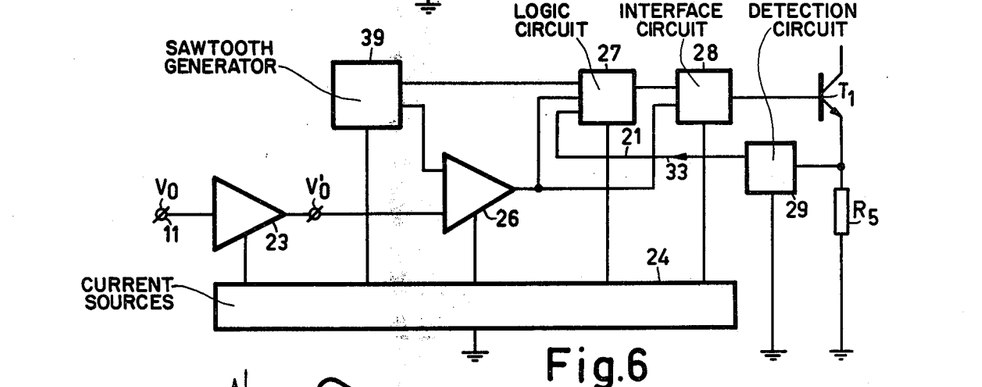

For controlling the forward sweep of the flyback converter as a function of the output voltage $V_o$, a sawtooth generator may be included in the control circuit. FIG. 6 shows a part of an example of a control circuit including a sawtooth generator 39. A first output of the sawtooth generator is connected to a first input of the pulse width modulator 26. After being amplified in the amplifier 23, the output voltage $V_o$ is applied to a second input of the pulse-width modulator 26, which is for example a differential amplifier.

Figure 7A:
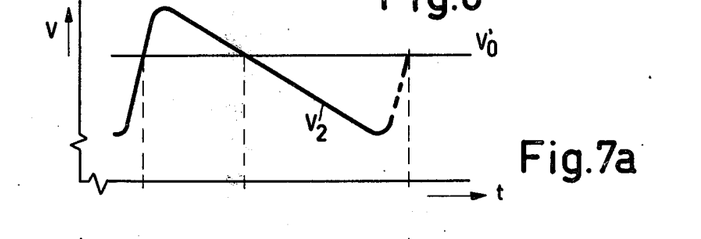
Figure 7B:
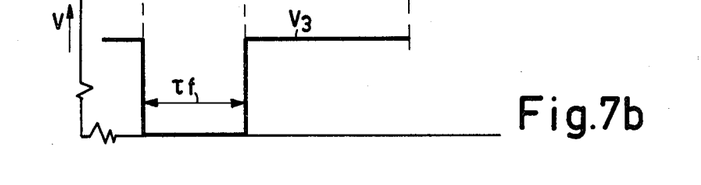

FIG. 7a shows the sawtooth voltage $V_2$ and the amplified output voltage $V_o'$ as a function of time. By comparison of these voltages in the pulsewidth modulator a squarewave voltage $V_3$ as shown in FIG. 7b appears at the output of said modulator. FIGS. 7a and 7b clearly show that upon a variation of the level of the output voltage $V_o'$ the duration of the pulses at the outputs of the modulator 26, i.e. the forward sweep time $\tau_f$, will vary. The pulses at the output of the modulator 26 are transferred to the base of the switching transistor $T_1$ via the interface circuit 28.

In order to control the forward sweep time $\tau_f$ in dependence on the information supplied by the detection circuit 29, the control circuit includes a bistable circuit 27. The pulse from the detection circuit 29, which indicates that the transistor $T_1$ is to be turned off, is applied to a first input of the bistable circuit 27. This pulse triggers the circuit 27 into a first stable state, the so-called "set" state. Upon each forward sweep of the flyback converter said bistable circuit is to be brought into a second stable state, the so-called "reset" state, so that in principle the control pulse from the modulator 26 can be transferred to the base of the transistor $T_1$. For obtaining this second state the rising edge of the sawtooth voltage may be used. For this purpose a second input of the bistable circuit 27 is connected to a second output of the generator 39. In order to prevent a second control pulse from being supplied during one period of the generator 39, the output of the pulse width modulator 26 is connected to a third input of the bistable circuit. When the rising edge of the sawtooth voltage is to be used for resetting the bistable circuit and if furthermore the duration of a forward sweep should be adjustable to zero, the rising edge of the sawtooth voltage should be very steep and the peak should exhibit minimal rounding. However, a very steep edge of the sawtooth voltage implies comparatively large currents in the integrated control circuit. In order to avoid cross-talk between the circuit components, the circuit would then have to be integrated on a comparatively large surface area. Furthermore it is difficult to realize a sawtooth voltage with a sharp peak.

Figure 8:
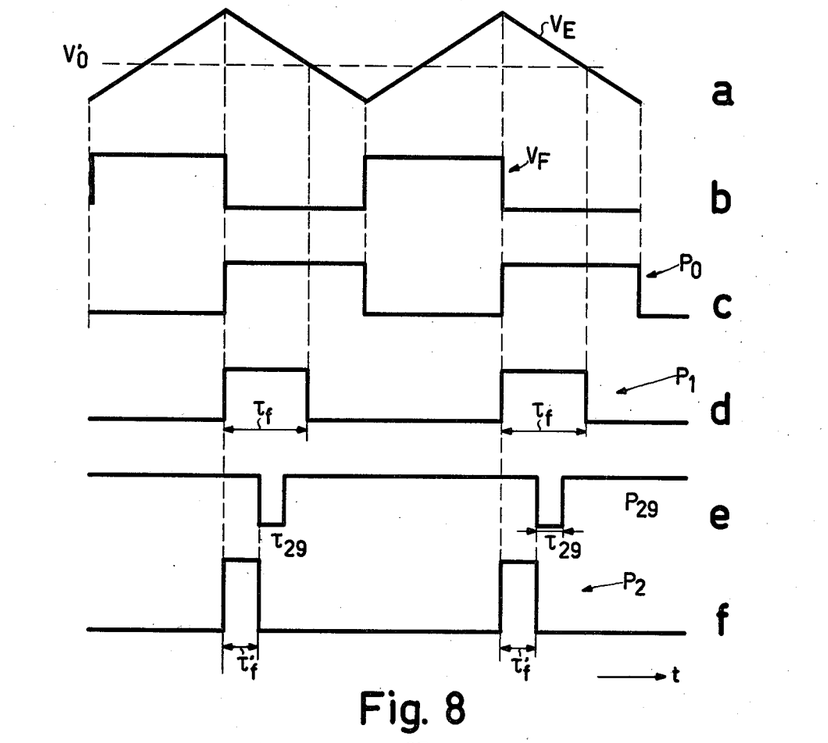

In accordance with the invention the above-mentioned problems can be avoided by including a generator supplying a triangular voltage in the control circuit. The control circuit is then arranged as is shown in FIG. 3. In this Figure the triangle wave generator bears the reference 25. $C_5$ is a capacitor of the triangle wave generator which is periodically charged and discharged. This capacitor and the resistor $R_6$ of the triangle wave generator are not integrated. In order to ensure that this generator supplies a constant frequency which is independent of variations in the supply voltage or variation in the elements of the generator, the generator 25 is connected to the reference voltage source 21. In addition to a triangular voltage the generator 25 also supplies a squarewave voltage whose high level corresponds to the falling edge of the triangular voltage. In FIG. 8 the triangular voltage is designated $V_E$ and the squarewave voltage $V_F$. The slopes of the voltage $V_E$ are smaller than the slope of the rising edge of the sawtooth voltage $V_2$ in FIG. 7a. The currents through the integrated circuit of FIG. 3 are then also smaller than those in the circuit in accordance with FIG. 6. The squarewave voltage is applied to the logic circuit 27. This circuit is shown in more detail in FIG. 9.

Figure 9:
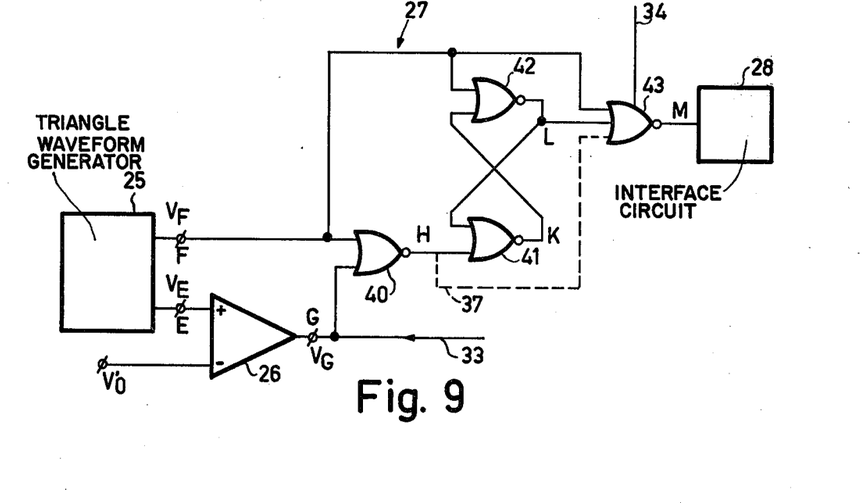
FIG. 9 shows a logic circuit which is included in the control circuit.

The circuit 27 comprises four so-called NOR-gates 40, 41, 42 and 43. At the output of these gates a logic 1 appears only if a logic 0 is applied to both inputs. A logic 0 means a low voltage level and a logic 1 a high voltage level.

The output voltage $V_G$ of the pulsewidth modulator 26 has a high level if the amplified output voltage ($V_o'$) is smaller than the triangular voltage ($V_E$). If $V_o'$ is greater than $V_E$ the voltage $V_G$ is at a low level.

Figure 10:
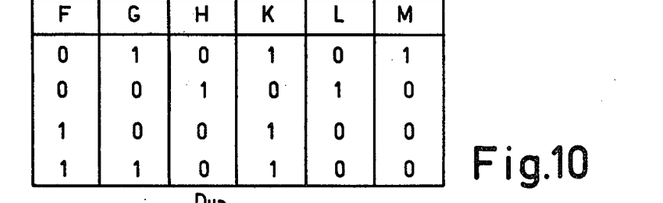
FIG. 10 represents the truth table of this logic circuit.

The behaviour of the logic circuit 27 in terms of logic 1 and logic 0, as a function of the level of the voltage at points F and G, is given by the truth table of FIG. 10. In this Table F, G, H, K, L and M represent the levels at the corresponding points in FIG. 9.

The gates 41 and 42 constitute a flip-flop circuit. This circuit is set to a first state (which is the reset state or the state L=0), in which state this circuit in principle can transfer switching pulses to the interface circuit 28, if the voltage at point F changes from a logic 1 to a logic 0. The circuit 41, 42 is set to a state 2 (L=1), in which state no switching pulses can be transferred, if the voltage at point G changes from a logic 1 to a logic 0, with the requirement that the voltage at point F represents a logic 0. The flip-flop circuit then ensures that during one period of the voltage $V_E$ only one switching pulse can be transferred.

From the table of FIG. 10, it follows that as long as $V_F$ represents a logic 0 a logic 1 will appear at the point M of the gate 43, provided that the voltage $V_G$ corresponds to a logic 1. If the voltage $V_F$ represents a logic 1, a logic 0 will appear at the output M. If the voltage $V_o'$ is zero volts, when the power-supply circuit is switched on with uncharged accumulator battery, $V_G$ always represents a logic 1, and if no pulse is applied via the connection 33, the duration of the switching pulses is determined by $V_F$. The switching pulses ($P_0$ in FIG. 8c) then have a maximum pulse duration, namely 50% of the period of the voltage $V_E$ (or $V_F$).

If the voltage $V_o'$ is not equal to zero volts (see FIG. 8a), this voltage also determines the duration ($\tau_f$) of the switching pulses ($P_1$ in FIG. 8d). As soon as $V_o'$ becomes equal to $V_E$, $V_G$ becomes a logic 0 and a logic 1 appears at the output H of the gate 40. The circuit 41, 42 is then set to state 2, as a result of which a logic 1 appears at the output M, and the switching pulse is discontinued.

By employing the triangle-wave generator 25 in conjunction with the logic circuit 27 the duration of the switching pulses can simply be controlled between 0% and 50% of the period of the voltage $V_E$.

From the detection circuit 29 a short pulse $P_{29}$ (FIG. 8e) can be applied to the input of the gate 40 which is connected to point G. This would result in a logic 0 at the output M for a short time only. As the pulse $P_{29}$ has set the flip-flop circuit to state 2, no logic 1 can appear at the output M immediately after the pulse $P_{29}$ has disappeared. Therefore, the circuit 41, 42 should first be set to state 1. This does not happen until the voltage $V_F$ has first been a logic 1 and has then changed to a logic 0. If moreover $V_G$ then has the value of a logic 1, a logic 1 can appear at the output M. Owing to the appearance of a pulse $P_{29}$ the forward sweep time ($\tau_f'$) will be shorter than in the absence of a pulse $P_{29}$ ($\tau_f$).

Instead of a NOR-gate with two inputs it is possible to use a NOR-gate with three inputs for the gate 43. The third input is then connected to point H, as is represented by the dashed line 37 in FIG. 9. This does not change the switching function of the logic circuit 27 but the switching is then slightly faster.

As can be seen in FIG. 3, the logic circuit 27 also receives information from the starting circuit 30 via the connection 34. This ensures that as long as a starting pulse from the starting circuit 30 is available, this pulse is transferred to the base of the transistor $T_1$.

Via the connection 35 (see FIG. 3) the triangle-wave generator 25 also receives information from the starting circuit 30. Thus it is achieved that during the starting pulse the triangle-wave generator is forced into a forward sweep. The pulse from the starting circuit and the pulse produced with the aid of the triangle-wave generator have a well defined time relationship with each other.

So far, the elements or sub-circuits of the circuit arrangement in accordance with FIG. 3, except for the amplifier 23, have been referred to only in terms of the functions to be performed by them. The reference voltage source 21, the Schmitt trigger 22, the current sources 24, the triangle-wave generator 25, and the differential amplifier 26 all may be of known design and will not be discussed in more detail. The interface 28, which should adapt the miniwatt non-saturation logic to the high-voltage transistor $T_1$, may also be of known design. Hereinafter some embodiments of the starting circuit 30, the detection circuit 29, and the current and voltage limiting circuit 20 will be discussed. These circuits are particularly suitable for the control circuit in accordance with the invention.

Figure 11:
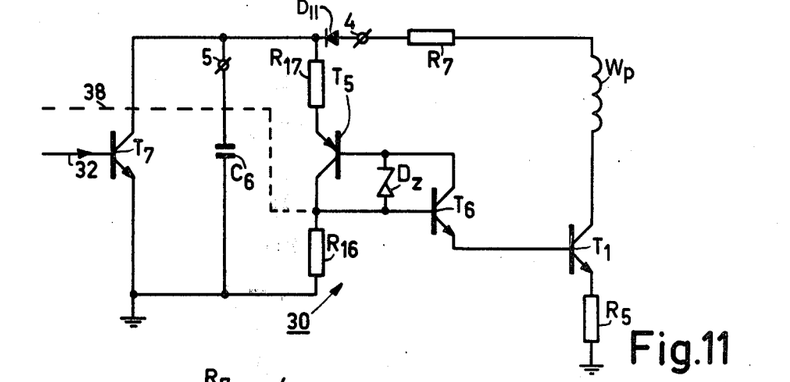
FIGS. 11 and 12 show examples of a starting circuit in accordance with the invention.

FIG. 11 shows in detail a first example of a starting circuit 30 in accordance with the invention. The major elements of this circuit are a starting capacitor $C_6$, two transistors $T_5$ and $T_6$, and a zener diode $D_z$ connected between the bases of the transistors $T_5$ and $T_6$.

The starting circuit operates as follows: From the instant that the input voltage $V_i$ (see FIG. 2) is applied, the capacitor $C_6$ is charged. At the instant that the capacitor voltage $V_{C_6}$ equals the sum of the voltage across the current-limiting resistor $R_{17}$, the zener voltage, the base-emitter threshold voltage of the transistor $T_5$, and the voltage across the resistor $R_{16}$, the transistor $T_5$ is turned on. The base voltage of the transistor $T_6$ is determined by the product of the resistance value of the resistor $R_{16}$ and the collector current of the transistor $T_5$. As the collector current through the transistor $T_5$ increases the voltage across the resistor $R_{16}$ will at a given instant exceed the sum of the base-emitter threshold voltages of the transistors $T_6$ and $T_1$ and the voltage across the resistor $R_5$, so that the transistors $T_6$ and $T_1$ are also turned on. At this instant the capacitor $C_6$ discharges into the base of the switching transistor $T_1$ via the transistors $T_5$ and $T_6$. The power supply circuit is then started and a forward sweep begins. When said threshold voltage is exceeded, the transistors $T_5$ and $T_6$, which constitute a thyristor circuit, keep each other in conduction.

A third transistor $T_7$ is included in parallel with the capacitor $C_6$. This transistor is connected via the lead 32 to the interface circuit 28 (see FIG. 3). This transistor ensures that as long as the control circuit is operative, the capacitor $C_6$ cannot be charged so that the starting circuit cannot supply a starting pulse.

Moreover, it is possible to apply a voltage which is proportional to the output voltage $V_o$ to the base of the transistor $T_6$ via a connection which is represented by a dashed line 38. Thus, the voltage $V_o$ also determines the instant of starting. After the input voltage $V_i$ has been applied the starting pulse can then appear at increasingly lower values of $V_i$ for the consecutive periods of the voltage $V_i$. Thus, it is ensured that the motor can start correctly.

The advantage of the starting circuit just described is that the voltages and currents appearing in it are comparatively low. As a result of this, said circuit, except for the resistor $R_7$ and the capacitor $C_6$, can readily be integrated together with the other circuitry of the control circuit.

In the starting circuit of FIG. 11 the capacitor $C_6$ cannot be discharged completely by the thyristor circuit $T_5$, $T_6$. In view of an additional function to be performed by the capacitor $C_6$ in a special variant of the detection circuit 29 to be described hereinafter, the capacitor $C_6$ should be discharged completely. This can be achieved in a second variant of the starting circuit shown in FIG. 12.

The left-hand part of this Figure again shows the thyristor circuit $T_5$, $T_6$, the zener diode $D_z$ and the resistor $R_{16}$. The current limiting resistors $R_{20}$ and $R_{21}$ and the diode $D_{12}$ ensure that as long as a current flows through the first thyristor circuit $T_5$, $T_6$, this current is highly constant. The transistor $T_{10}$ provides the main current through the transistor $T_6$, while the transistor $T_5$ provides the base current for the transistor $T_6$. In the right-hand part of FIG. 12 a second thyristor circuit is shown which is constituted by the transistors $T_{12}$ and $T_{13}$.

Figure 12:
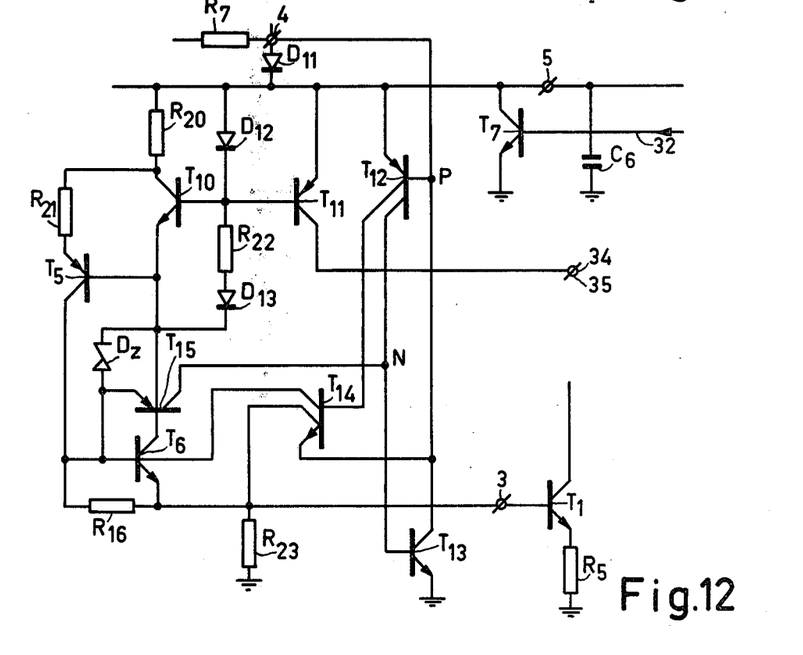

This starting circuit operates as follows: From the instant that the input voltage $V_i$ (see FIG. 2) is applied, the capacitor $C_6$ is charged via the diode $D_{11}$. Initially there is not yet any current through the first thyristor circuit $T_5$, $T_6$ and the second thyristor circuit $T_{12}$, $T_{13}$. When the voltage across the capacitor $C_6$ exceeds a certain level, the thyristor circuit $T_5$, $T_6$ is turned on as described with reference to FIG. 11. The second thyristor circuit is then still extinguished because the voltage at point 4, the base voltage for the transistor $T_{12}$, is positive relative to the voltage at point 5, the emitter voltage for the transistor $T_{12}$. When the capacitor $C_6$ discharges via the first thyristor circuit, the transistor $T_{15}$ is turned on, so that transistor $T_{13}$ is also driven into conduction. The voltage at the base of transistor $T_{12}$ then decreases. Then a current starts to flow via transistor $T_{12}$ to the base of the transistor $T_{13}$, so that this transistor is further driven into conduction and thus the transistor $T_{12}$ etc. The thyristor circuit $T_{12}$, $T_{13}$ is turned on rapidly at the instant that the voltage across the capacitor $C_6$ drops below a specific level. Via the transistor $T_{14}$, which has two collectors, of which the first collector is connected to ground via the resistor $R_{23}$ and the second to the base of transistor $T_6$, the base voltage of the transistor $T_6$ is then rapidly reduced. As a result, said transistor and thus the first thyristor circuit are rapidly turned off.

The capacitor $C_6$ is then further discharged via the thyristor circuit $T_{12}$, $T_{13}$. As soon as this capacitor has been discharged the thyristor circuit $T_{12}$, $T_{13}$ is turned off because the base voltage of $T_{12}$ then becomes positive relative to its emitter voltage.

The thyristor circuit $T_{12}$, $T_{13}$ can discharge the capacitor $C_6$ only when the supply of electric charge to $C_6$ via the diode $D_{11}$ is blocked. As soon as the capacitor $C_6$ again receives a charging current the voltage drop across the resistor $R_7$ causes the base voltage for the transistor $T_{12}$ to become positive relative to the emitter voltage for this transistor and the thyristor circuit $T_{12}$, $T_{13}$ is turned off.

The transistor $T_7$ has a similar function as in the circuit in accordance with FIG. 11. The starting circuit of FIG. 12 further comprises a transistor $T_{11}$. Via this transistor the state of the first thyristor circuit, i.e. delivery or no delivery of base current to the high-voltage transistor $T_1$, is transferred to the generator 25 and to the logic circuit 27 via the connections 34 and 35 (see FIG. 3). The state of the thyristor circuit $T_5$, $T_6$ can also be transferred to the generator 25 and the logic circuit 27 in a control circuit which includes a starting circuit in accordance with FIG. 11.

It is desirable to maintain the maximum average output power supplied by the power supply device in accordance with the invention constant at different values of the input voltage $V_i$. As has been set forth hereinbefore, the control circuit (integrated circuit 1) is activated at a specific level of the input voltage. It will be evident that the control circuit remains operative for a greater part of the period of the input voltage if the input voltage is an alternating voltage having an amplitude of 290 V than if the input voltage is an alternating voltage having an amplitude of 90 V. As a result, without further measures, the flyback converter would supply more power at an input voltage of 290 V than at an input voltage of 90 V. At higher effective values of the input voltage the maximum average output power should be limited.

Therefore, in accordance with a well known principle, a voltage which is proportional to the current through the high-voltage transistor $T_1$ may be used for controlling a thyristor. This thyristor is turned on as soon as the current through the transistor $T_1$ exceeds a specific level. Transistor $T_1$ can then be turned off by the thyristor. Furthermore, the thyristor can transfer a pulse to the logic circuit 27 so that the switching pulses supplied by the control circuit 1 are discontinued prematurely.

However, in this way the average output current $I_s$ for different effective values of the input voltage $V_i$ cannot be maintained constant. This can be explained with reference to FIGS. 13a and 13b.

Figure 13A:
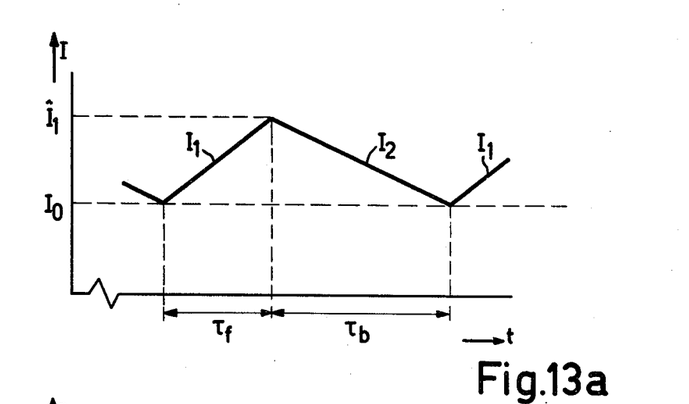
FIGS. 13a and 13b represent the current through the primary and the transformed current through the secondary winding of the flyback converter at different input voltage levels.

FIG. 13a shows the variation of the current $I_1$ through the primary winding during a forward sweep ($\tau_f$) and the variation of the current $I_2$ during a flyback period ($\tau_b$). $I_2$ is the secondary current which has been transformed to the primary side of the transformer. The slopes of $I_1$ and $I_2$ respectively are determined by the instantaneous value of the rectified voltage $V_A$ and the secondary voltage $V_s$ respectively. $I_1$ is limited to a value $\hat{I}1$, for example with the aid of said thyristor. $I_o$ is the value of $I_2$ at the instant that a flyback is terminated and a following sweep begins. For a specific fixed secondary voltage the slope of $I_2$ will be constant.

Figure 13B:
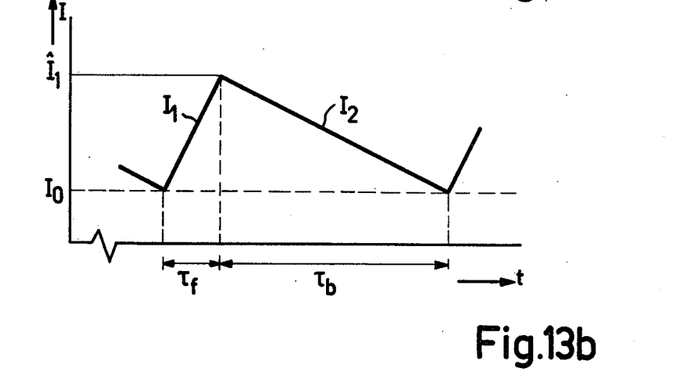

The voltage $V_A$ is an unsmoothed voltage. As a reslt, the slope of $I_1$ will change constantly for the consecutive forward sweeps during one period of the voltage $V_A$. FIG. 13b shows the variation of $I_1$ and $I_2$ at a higher instantaneous value of the voltage $V_A$. $\hat{I}_1$ is the same as in FIG. 13a. However, the forward sweep period $\tau_f$ is shorter and the value of $I_o$ is smaller than in FIG. 13a. The average value of $I_2$ over one flyback period is not constant for the consecutive flyback periods in one period of the voltage $V_A$. However, averaged over one period of the voltage $V_A$, $I_2$ will have a constant value for one specific effective value of $V_A$. However, without taking any further steps the last-mentioned average value of $I_2$ will vary upon a variation of the effective value of $V_A$, and thus upon a variation of the effective value of the input voltage $V_i$.

In accordance with the invention the value of $\hat{I}_1$ is adapted to the effective value of the input voltage $V_i$. As is shown in FIG. 14, the power supply circuit includes a correction network comprising the resistors $R_{18}$ and $R_{19}$. The sum of the voltage across $R_{19}$, which is proportional to the voltage $V_A$, and of the voltage across $R_5$, which is proportional to the current through the transistor $T_5$, is applied to a thyristor circuit. This thyristor circuit for example comprises a PNP-NPN transistor pair $T_{16}$, $T_{17}$. If the sum of said voltages exceeds a specific value, the transistor $T_{17}$, and thus the thyristor circuit $T_{16}$, $T_{17}$, is turned on. Transistor $T_1$ is then cut off and a pulse is transferred to the logic circuit 27 via the connection 33.

As the voltage across $R_{19}$ is added to the voltage across $R_5$ it is achieved that $\hat{I}_1$ is smaller for a higher effective value of the voltage $V_A$ than for a lower effective value of the voltage $V_A$. Thus, a reasonably constant average output current can be obtained for all input voltages between 90 and 290 V during starting of the motor.

Figure 15:
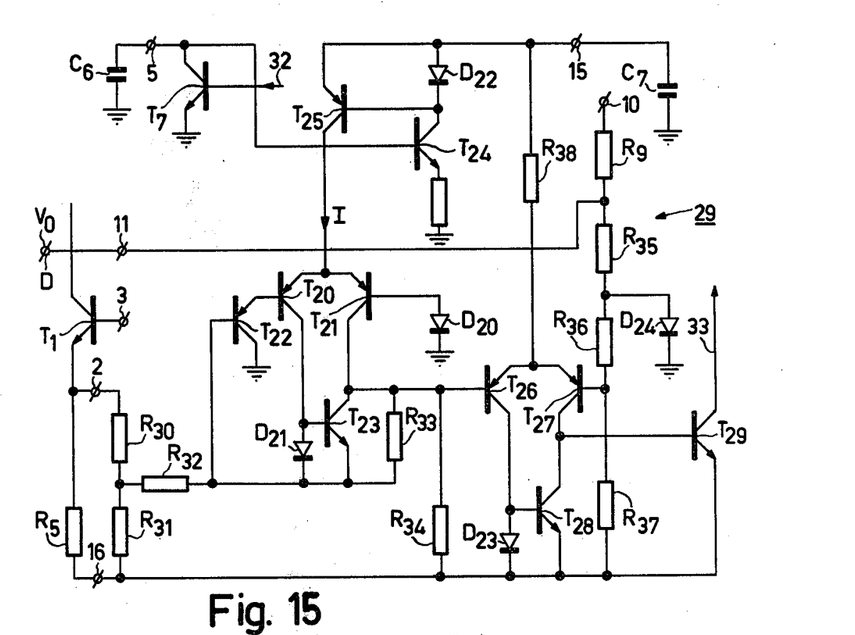

FIG. 15 shows a second and preferred variant of a detection circuit 29. In the flyback converter the current through the primary winding and the transistor $T_1$ for each period of the rectified voltage $V_A$ does not always start from the zero value, but this current increases from an increasingly higher initial value for the consecutive periods of the rectified voltage $V_A$. When the magnitude of the current through the transistor $T_1$ is used as the only criterion for interrupting this current, it is not unlikely, in particular for small forward sweep times, that the transistor $T_1$ is turned off before enough energy is stored in the primary winding. In the energy detection circuit of FIG. 15 allowance is made for this and the maximum amount of energy supplied by the flyback converter is determined by this circuit.

The principal element of this circuit is a differential amplifier which is constituted by the transistors $T_{20}$ and $T_{21}$. The base of the transistor $T_{21}$ is maintained at a fixed voltage with the aid of the diode $D_{20}$. Via the transistor $T_{22}$ and the voltage divider $R_{30}$, $R_{31}$ the voltage across the resistor $R_5$, which voltage is proportional to the current through the transistor $T_1$, is applied to the base of the transistor $T_{20}$.

As is known, the output current of the differential amplifier $T_{20}$, $T_{21}$ is proportional to the product of the slope and the difference between the voltages at the bases of the transistors $T_{20}$ and $T_{21}$. The slope is then given by $S = a \times I$, I being the tail current through the differential amplifier and a a temperature dependent quantity ($a = (q/KT)$, where q is the charge of an electron, K the Boltzmann constant, and T the absolute temperature). The current I, and thus the slope S, is now dependent on the input voltage $V_i$. For this use is made of the capacitor $C_7$ of the starting circuit.

When the flyback converter has been started and the control circuit 1 has been switched on, transistor $T_7$ is cut off during the forward sweeps by the interface circuit 28 via the connection 32, so that the capacitor $C_6$ is slightly charged. During the flybacks the transistor $T_7$ is turned on and the charge on $C_6$ can be drained again. The voltage across capacitor $C_6$ during the forward sweeps is given by $VC_6 = (Ic_6 \cdot t)/C_6$. The charging current $Ic_6$ is proportional to the input voltage $V_i$. With the aid of a converter circuit the variation in the voltage $VC_6$ is converted into a variation of the current through the differential amplifier $T_{20}$, $T_{21}$. This converter circuit comprises a first transistor $T_{24}$ to whose base the voltage $Vc_6$ is applied and a current mirror constituted by the diode $D_{22}$ and a second transistor $T_{25}$. The tail current I through the differential amplifier $T_{20}$, $T_{21}$ is then given by $I = b \cdot V_i \cdot T$, where b is a constant which is inter alia determined by the capacitance of $C_6$ and the elements of the current-voltage converter. The slope S of the differential amplifier is then $S = a \cdot b \cdot V_i \cdot t$. The difference in the base voltages of the transistors $T_{20}$ and $T_{21}$ is proportional to the current through the resistor $R_5$, which current is given by $I_5 = I_o + d \cdot V_i \cdot t$. In this equation d is a constant which includes the impedance of the primary winding. $I_0$ is a residual current which is caused by the fact that the transformer still contains residual energy, which residual energy is constant for the consecutive forward sweeps. Consequently, the output signal of the differential amplifier is proportional to $(I_o + d \cdot V_i \cdot t)$ $a \cdot b \cdot V_i \cdot t$. As soon as this output signal exceeds a given level, transistor $T_{29}$ is turned on via a second differential amplifier $T_{26}$, $T_{27}$. As a result of this, the level at the input of the gate 40 of the logic circuit 27 is set to a logic zero via the connection 33 (see FIGS. 8 and 9) and a switching pulse at the base of the transistor $T_1$ is terminated prematurely. Allowance is thus made for the magnitude of the current through the primary winding and the magnitude of the input voltage.

Preferably, the output of the differential amplifier $T_{20}$, $T_{21}$ consists of a current mirror in the form of a diode $D_{21}$ and a transistor $T_{23}$. The advantage of the current mirror is that the influence of a d.c. component on the output signal of the differential amplifier is eliminated.

The energy detection circuit in accordance with FIG. 15 moreover comprises a second differential amplifier comprising the transistors $T_{26}$ and $T_{27}$ with a common emitter resistor $R_{38}$. The output of this differential amplifier also consists of a current mirror comprising a diode $D_{23}$ and a transistor $T_{28}$. Via this differential amplifier the voltage across the accumulator battery can also determine the energy supplied by the flyback converter. The voltage $V_o$ across the accumulator battery is applied to the base of the transistor $T_{27}$ via a voltage divider $R_{35}$, $R_{36}$ and $R_{37}$.

During each forward sweep of the flyback converter the instant at which transistor $T_{29}$ is turned on is determined by the instant at which the voltage at the base of transistor $T_{26}$ exceeds the voltage at the base of the transistor $T_{27}$. When the voltage $V_o$ is low, for example during starting of the motor, said instant appears earlier in the flyback than when the voltage $V_o$ has a higher value. By employing the differential amplifier $T_{26}$, $T_{27}$ it is achieved that in the event of a short-circuit ($V_o = 0$) the secondary currents are limited.

As previously stated, the voltage across the accumulator battery is not well-defined during a transition from a forward sweep to a flyback. Therefore, the energy detection circuit includes a diode $D_{24}$ which ensures that during such a transition a fixed voltage is applied to the base of the transistor $T_{27}$ during a short time interval. During a transition the voltage across the accumulator battery is briefly suppressed; the diode $D_{24}$ needs some time to adjust to the actual voltage across the accumulator battery. During each forward sweep the voltage at the base of the transistor $T_{27}$ exceeds the voltage at the base of the transistor $T_{26}$, at least during a short time interval, so that the transistor $T_{29}$ is cut off at least for a short time interval. Thus, the pulse duration of the switching pulses supplied by the control circuit is always greater than zero.

It is to be noted that the current detection circuit operates independently of the generator 25 (see FIG. 3).

Figure 16:
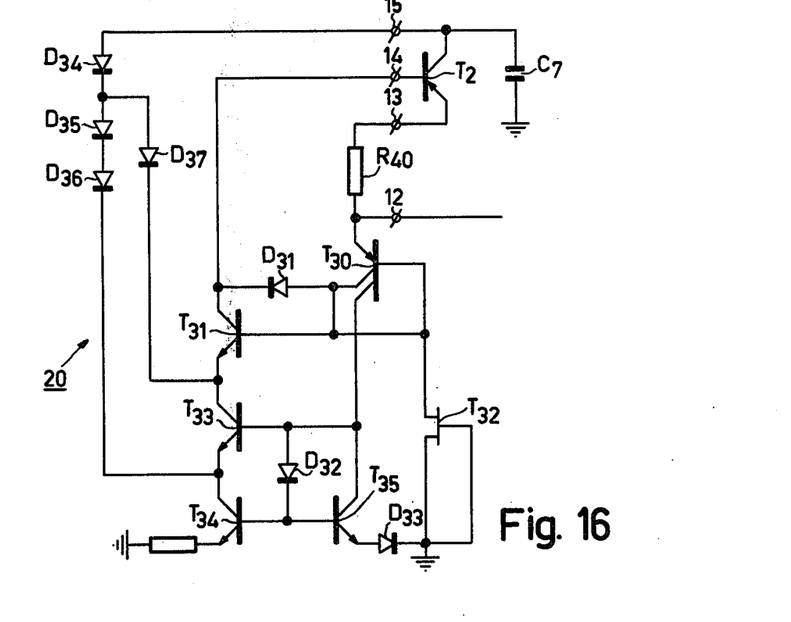
FIG. 16 shows an example of a current and voltage limiting circuit for the power supply of the control circuit.

The voltage $V_S$ (see FIG. 2) of the flyback converter may exhibit large variations (for example from 2.5 to 25 V). The current through the primary winding may also be large, in particular during switching on. In order to use the voltage across the capacitor $C_7$ (see FIG. 8) as a supply voltage for the integrated circuit 1, said voltage should be limited and stabilized, for example between 3.5 and 4 V. Furthermore, the charging current for the capacitor $C_7$ should be limited because this current is also transformed to the primary winding. A circuit arrangement which satisfies the above requirements in a suitable manner is shown in FIG. 16.

The charging current for the capacitor $C_7$, which current flows via the transistor $T_2$ and the resistor $R_{40}$, is limited with the aid of the transistors $T_{30}$ and the diode $D_{31}$. The transistor $T_{30}$ has two collectors, one of which is connected to the base of this transistor so that this transistor constitutes a current mirror. $T_{32}$ is a field-effect transistor which is employed as a resistor. This resistor serves for biassing the transistor $T_{30}$. When a voltage is applied to point 12, the transistors $T_{30}$ and $T_{35}$ are turned on. The base voltages for the transistors $T_{34}$, $T_{33}$ and $T_{31}$ are then at a level such that these transistors conduct. As a result of this, the base current for the transistor $T_2$ is adjusted so that said transistor is also turned on. Then, a charging current flows from point 12 via the resistor $R_{40}$ and the transistor $T_2$ into the capacitor $C_7$. The charging current is limited with the aid of the resistor $R_{40}$. If the charging current tends to increase significantly, the voltage drop across the resistor $R_{40}$ also tends to increase. The increase of the voltage across the resistor $R_{40}$ is transmitted to the base of the transistor $T_2$ via the diode branch of $T_{30}$ and the diode $D_{31}$. As the voltage across at resistor $R_{40}$ increases the voltage at the base of transistor $T_2$ increases so that the current through this transistor decreases again. In this way the current through the transistor $T_2$ and thus the charging current for the capacitor $C_7$ is maintained constant.

The voltage across the capacitor $C_7$ is limited with the aid of the diodes $D_{34}$, $D_{35}$ and $D_{36}$, the transistors $T_{31}$ and $T_{35}$, and the diodes $D_{32}$ and $D_{33}$. If a charging current is to flow through the transistor $T_2$, the transistor $T_{33}$ should be conductive, i.e. the base voltage for this transistor should be sufficiently positive relative to its emitter voltage. The emitter of the transistor $T_{33}$ is connected to the capacitor $C_7$ via three diodes so that this emitter voltage equals the voltage across $C_7$ minus the voltage drop across the three diodes. The base of the transistor $T_{33}$ is connected to ground via the diodes $D_{32}$ and $D_{33}$, and the transistor $T_{35}$, so that the base voltage roughly equals the voltage drop across the three diodes. The transistor $T_{33}$ is conductive as long as its emitter voltage is not greater than the voltage drop across two diodes. This means that the voltage across the capacitor $C_7$ is at the most equal to five times the voltage drop across the diode. Should the capacitor voltage exceed five diode voltages, the transistor $T_{33}$ is turned off so that the base current for the transistor $T_2$ is reduced or interrupted and likewise the charging current for the capacitor $C_7$.

The diode $D_{37}$ has been included in order to prevent the transistor $T_2$ from conducting a current in the wrong direction if the voltage at point 12 is lower than the voltage across the capacitor $C_7$. In the last-mentioned case it is ensured that, via the voltage drop across the diodes $D_{34}$ and $D_{37}$, the transistor $T_{31}$ is turned off so that no base current can flow to the transistor $T_2$.

The fact that the invention has been described on the basis of the power supply circuit for an electric shaving apparatus does not mean that it is limited thereto. The invention can generally be used in those cases where a switched power supply is needed whose power supply circuit should be compact and light-weight and consume little power.

What is claimed is:

1. A device for energizing a d.c. motor comprising a flyback converter having an output circuit to which the motor may be connected, the flyback converter comprising a control circuit, which for the greater part is designed as an integrated circuit, for generating control pulses having a fixed frequency of the order of tens of kHz and with a controlled pulse duration for controlling a switching element which is connected in series with a primary winding of a transformer in the flyback converter, the control circuit including means for controlling the pulse duration of the control pulses depending on the output voltage and the current through the primary winding of the transformer, a rechargeable accumulator battery connected in series with a secondary winding of said transformer, switching means for connecting the motor in parallel with the accumulator battery, a power-supply capacitor for energizing the control-circuit, said power-supply capacitor being charged from the secondary winding of the transformer, the control circuit further comprising a voltage-level detector which keeps the control circuit in the active state when the voltage across the power-supply capacitor exceeds a specific threshold voltage, a starting circuit including a starting capacitor for supplying, in the case of an inactive control circuit, a control current for the switching element provided that the voltage across the starting capacitor and the instantaneous input voltage exceed a specific level, and wherein the pulse duration controlling means includes a detection circuit for detecting the current through the primary winding of the transformer and also the instantaneous value of the input voltage so that the pulse duration of the control pulses is also determined by the instantaneous value of the input voltage.

2. A device as claimed in claim 1 wherein the pulse duration controlling means of the control circuit includes a voltage generator which supplies a periodic voltage with linear edges, a pulse-width modulator having a first input connected to the voltage generator, means for applying a voltage determined by the output voltage to a second input to said modulator, and a logic circuit for transferring pulses supplied by the pulse width modulator to a control input of the switching element, a first input of said logic circuit being connected to the output of the voltage generator and a second input thereof being connected to the output of the pulse-width modulator and to the output of the detection circuit.

3. A device as claimed in claim 2 wherein the voltage generator supplies a triangular voltage, and means connecting a control input of said voltage generator and a control input of the logic circuit to an output of the starting circuit.

4. A device as claimed in claim 1 or 2, wherein the starting circuit includes a thyristor circuit which comprises a zener diode, and a second switching element connected in parallel with the starting capacitor and having a control input connected to an output of the control circuit so that the starting circuit is deactivated while the control circuit is activated.

5. A device as claimed in claim 4, wherein the starting circuit further comprises a second thyristor circuit for turning off the first thryristor circuit when the voltage across the starting capacitor is below a specific value.

6. A device as claimed in claim 2 wherein the detection circuit includes a thyristor circuit having a control input, the switching element comprises a switching transistor with a resistor connected to its emitter, a voltage divider, means coupling the voltage across the emitter resistor and the voltage from the voltage divider to the control input of the thyristor circuit, means connecting the voltage divider in parallel with the series connection of the transformer primary winding and the collector-emitter path of the switching transistor.

7. A device as claimed in claim 4 wherein the detection cicrcuit comprises a differential amplifier including a pair of transistors connected in a longtailed pair cicuit configuration and having a first control input connected to a reference voltage source and a second control input connected to a voltage which is proportional to the current through the primary winding of the transformer, and means coupling the starting capacitor to the longtailed pair circuit to make the amplifier tail current proportional to the voltage across the starting capacitor.

8. A device as claimed in claim 7 wherein the detection circuit further comprises a second differential amplifier having a first input connected to the output of the first differential amplifier and a second input coupled to receive the output voltage of the flyback converter via a voltage divider.

9. A power supply device for energizing a D.C. motor comprising, a flyback converter that includes a transformer having a primary and a secondary winding and a controlled switching element connected in series with the primary winding across a pair of input supply voltage terminals, an output terminal coupled to the secondary winding for deriving an output voltage for said motor, switching means for selectively connecting a rechargeable battery in parallel with the motor, a control circuit coupled to a control electrode of said switching element for deriving control pulses of a fixed frequency and with a controllable pulse duration for controlling the operation of the switching element, a power-supply capacitor responsive to the voltage developed at said secondary winding for deriving an energizing voltage for the control circuit, and said control circuit comprises, means for controlling the pulse duration of the derived control pulses as a function of the output voltage and the current in the transformer primary winding, a voltage-level detector coupled to the power-supply capacitor for activating the control circuit when the voltage across said power-supply capacitor exceeds a given voltage level, and a starting circuit including a starting capacitor coupled to the primary winding for supplying a start signal to the control elctrode of the controlled switching element provided that the voltage across the starting capacitor and the input voltage exceed a given level and the control circuit is inactive.

10. A device as claimed in claim 9 wherein the means for controlling the pulse duration as a function of the primary winding current includes a detection circuit responsive to the primary winding current and to the input supply voltage for deriving a control signal that controls the pulse duration as a function of both the primary winding current and the input supply voltage.

11. A device as claimed in claim 10 wherein the detection circuit comprises first and second differential amplifiers, means for deriving a voltage proportional to the primary winding current, a source of reference voltage, means connecting first and second inputs of the first differential amplifier to said voltage deriving means and said reference voltage source, respectively, and means coupling first and second inputs of the second differential amplifier to the output of the first differential amplifier and to the flyback converter output terminal, respectively.

12. A device as claimed in claim 9 wherein said pulse duration controlling means of the control circuit further comprises, a waveform generator for deriving a periodic voltage having rising and falling linear edges, a pulse-width modulator having a first input coupled to the output of the waveform generator and a second input coupled to the output terminal of the flyback converter, a logic circuit having first and second inputs coupled to the waveform generator output and to the pulse-width modulator output, respectively, and means coupling the output of the logic circuit to the control electrode of the switching element to supply thereto said control pulses of controllable pulse duration.

13. A device as claimed in claim 12 wherein the means for controlling the pulse duration as a function of the primary winding current includes a detection circuit responsive to the primary winding current and the input supply voltage for deriving a control signal that varies as a function of the primary winding current and the input supply voltage, and means coupling said control signal to an input of the logic circuit to further control the pulse duration of said control pulses as a function of the detection circuit control signal.

14. A device as claimed in claim 12 wherein the control circuit further comprises an inhibit circuit responsive to control pulses supplied by the logic circuit and coupled to the starting capacitor for inhibiting the operation of the starting circuit when the control circuit is active to produce said control pulses.

* * * * *